July 9, 1946.  H. ASHWORTH  2,403,484

TAPPING AND THREADING MACHINE

Filed Nov. 4, 1943

INVENTOR.
HANDEL ASHWORTH
BY
ATTORNEY

Patented July 9, 1946

2,403,484

UNITED STATES PATENT OFFICE 2,403,484

TAPPING AND THREADING MACHINE

Handel Ashworth, Baldwin, N. Y.

Application November 4, 1943, Serial No. 508,942

2 Claims. (Cl. 10—136)

This invention relates generally to the art of tapping and threading and more particularly to an improved automatic threading and tapping machine.

Among the principal objects of the present invention lies the provision of a tapping and threading machine which produces work of a high degree of accuracy comparable to that produced by accurate screw thread cutting lathes.

Another object herein lies in the provision of a machine of the class described by the use of which, after the initial adjustments have been made, a large number of uniformly tapped or threaded articles may be produced, even though the skill or experience of the operator be of low order.

A still further object of the present invention lies in the fact that adjustments in the machine to accommodate the same to changes in the type, size, or kind of the work piece operated upon may be quickly and conveniently made, without the use of tools or special skill.

A feature of the invention lies in the fact that as each piece has the work thereon finished, it may be quickly removed and a new unworked piece secured in its stead, so that rapid large scale production is provided.

These objects and other incidental ends and advantages will more fully appear in the progress of this disclosure and be pointed out in the appended claims.

In the drawing, in which similar reference characters designate corresponding parts throughout the several views.

Figure 1:
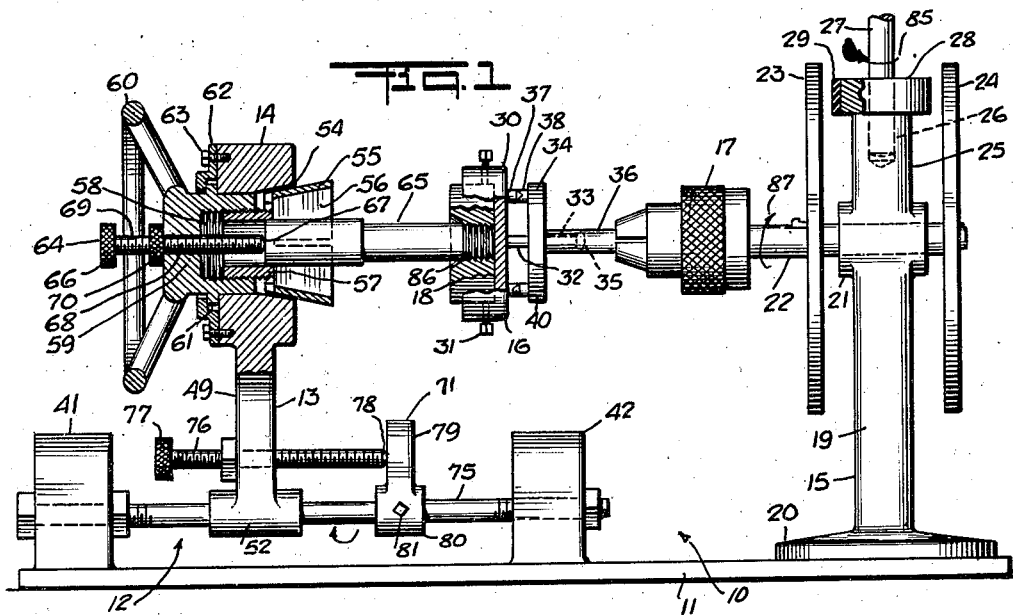
Figure 1 is a fragmentary side elevational view of a preferred embodiment of the invention, certain parts being shown in section.

In accordance with the invention the threading and tapping machine generally indicated by numeral 10 comprises a base 11, a bed 12, a carriage 13, a work holder 14, a reversible driver 15, a tool holder 16 and driver chuck 17.

As shown in the accompanying drawing by way of example, the machine is set up in such a manner as to illustrate the use thereof in a threading operation. As will be obvious to those skilled in the art to which the present invention relates, the tool holder 16 may have substituted therefor a similarly constructed tap (not shown). As will be apparent in the course of this disclosure, such substitution of a tap for the threading die 18 may be simply and easily accomplished.

Figure 2:
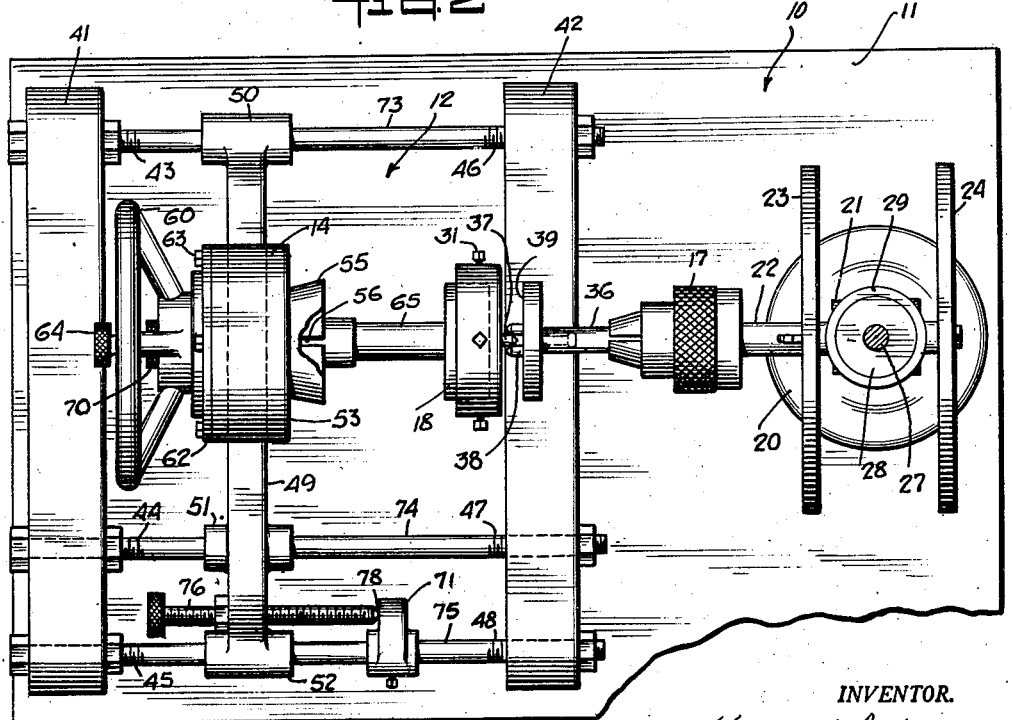
Figure 2 is a fragmentary plan view of Figure 1.

As best seen in the right-hand portion of Figures 1 and 2, the reversible driver 15 includes a generally vertically arranged body 19 having a pedestal 20 at the lower end thereof.

The body 19 is provided with a horizontally arranged bearing 21 in which is slidably and rotatably mounted a drive shaft 22. The shaft 22 at the forward end thereof carries the driver chuck 17, which may be of any well known construction. The rear portion of the drive shaft 22 as previously described is rotatably and slidably mounted in the bearing 21 and has keyed thereto a pair of driver discs 23 and 24. The upper portion 25 of the body 19 extends above the bearing 21 and has a vertically arranged bearing 26 within which is mounted the vertical drive shaft 27. The shaft 27 is free to rotate in the bearing 26 and has keyed thereto a disc 28 with a rim of frictional material 29 as for example, rubber or leather. The diameter of the disc 28 is slightly less than the distance between the discs 23 and 24 so that the discs 23 or 24 may alternately contact the rim of frictional material 29 as the drive shaft 22 is horizontally reciprocated as will be more fully described hereinbelow. The tool holder 16 includes a cup shaped member 30 which acts as a socket or receptacle for the threading die 18. The die 18 is detachably engaged within the receptacle 30 by means of set screws 31 in a well known manner. The receptacle 30 has an integral rearwardly and horizontally extending shank 32 which is loosely fitted within the bore 33 in the socket joint 34. The rear end of the shank 32 is provided with an enlargement 35 which engages a correspondingly enlarged portion in the stem 36 of the socket joint 34 so that the shank 32 may shift slightly in any radial direction with respect to the stem 36. The rear surface of the receptacle 30 is provided with a pair of diametrically arranged and rearwardly directed drive pins 37 which are adapted to abut against a pair of similarly disposed pins 38 projecting from the front face 39 of the disc-like body 40 of the socket joint 34.

The bed 12 includes a front upright plate 41 and a rear upright plate 42. The plates 41 and 42 are secured to the upper surface of the base 11 in any suitable manner. Between the plates 41 and 42 are a plurality of guide rods 73, 74 and 75. The guide rods 73—75 inclusive, are disposed in spaced and parallel arrangement, suspended from and fixedly secured to the plates 41 and 42 in any suitable manner as for example, by threading the ends of the rods as indicated at numerals 43—48 inclusive, and securing the rods in place by means of nuts threadedly engaged thereon.

The carriage 13 includes a body 49 having a plurality of bearings 50, 51 and 52 at the lowermost portions thereof. The bearings 50—52 inclusive are penetrated by the guide rods 43—45 inclusive respectively, and said bearings as well as the carriage 13 have longitudinal horizontal rectilinear movement therealong. The upper portion of the body 49 is enlarged to form the head 53. The head 53 is provided with a horizontal longitudinally directed bore 54 the rear portion of which may be outwardly tapered to receive the taper sleeve 55, within which is disposed the split tapered collet 56. The rear portion of the collet 56 has an externally threaded hollow neck 57 adapted to be threadedly engaged by the internally threaded bore 58 of the hub 59 of the work clamping wheel 60. The outer cylindrical surface of the hub 59 is journaled in the bore 54, and is provided with a peripheral flange 61 which is rotatably positioned within the retainer ring 62. The said ring 62 is secured to the rear surface of the head 53 by the bolts 63. Thus, the hub 59 is adapted for rotation about a horizontal axis within the head 53 but is incapable of axial movement with relation thereto.

The clamp wheel 60 in the hub 59 thereof is provided with means 64 to axially position the work piece 65 within the collet 56. Said means includes a threaded bolt 69 having a head 66 at the front end thereof and a rounded terminal 67 at the rear end thereof. The bolt 69 is threadedly engaged in a central orifice 68 in the hub 59. The bolt 69 is secured in any longitudinally adjusted position thereof by means of the lock nut 70.

Detent means generally indicated by numeral 71 to limit the movement of the carriage 13 toward the threading tool or tool holder 16 are positioned upon the guide rod 75 and include the bolt 76 which is threadedly engaged in the body 49 of the carriage 13 in the lower right hand portion thereof. The bolt 76 is provided with an enlarged head 77 and a rounded rear terminal 78. The stop 79 has a bearing 80 at the lower portion thereof which is slidably positioned upon the guide rod 75 and may be fixedly secured in any longitudinally adjusted position thereof by means of the set screw 81.

By reason of the adaptability of the present device it may be used in various manufacturing machining operations. For the purpose of clarity in the present disclosure, however, one mode of operation is here given. The base 11 may be suitably secured as by clamping to any working surface as for example, a table of a drill press (not shown). The vertical drive shaft 27 may be engaged within a chuck of a motor-driven drill press or may be connected to any other suitable prime mover such as an electric motor (not shown). Assuming shaft 27 to be rotating in the direction indicated by arrow 85 with the discs 23 and 24 disengaged from the disc 28 the device will be in a neutral condition. Assuming that a threading operation is to be performed, the die 18 is secured within the receptacle 30 by manipulation of the set screws 31 and the stem 36 is engaged by manipulation of the chuck 17. Assuming a work piece like the piece 65 for example, the bolt 69 is adjusted in position by rotating the head 66 thereof so that the proper amount of the work piece 65 will project from the front face of the collet 56. After the bolt 69 is properly adjusted the lock nut 70 is tightened. Now the clamp wheel 60 is rotated to close the collet 56 and to securely clamp the work piece 65 within said collet. The carriage 13 is now moved rearwardly or toward the driver 15. As soon as the rear end of the work piece 65 contacts the conical portion 86 of the die 18 this causes the stem 36 and the drive shaft 22 to move rearwardly (toward the driver 15). This rearward movement results in the rear surface of the disc 23 contacting the rim 29 of the disc 28 causing the rim and the parts directly and articulately connected thereto to rotate in the direction of the arrow 87. The threading operation is continued for the requisite depth or extent upon the piece 65 when rearward pressure upon the clamping wheel 60 or the carriage 13 is stopped. This stoppage will result in a separation or slippage between the disc 23 and the rim 29 and a cessation of the threading operation. At this point the screw 76 and/or the stop 79 are adjusted in position with relation to each other and to the rod 75 so that further rearward movement of the carriage 13 is prevented. This last described setting operation of the bolt 76 and the stop 79, as well as the setting of the bolt 69 need only be done once for the first work piece in any series of identical work pieces.

After the work piece 65 has been properly threaded at the rear end thereof forward motion of the carriage 13 or the hand wheel 60 will pull the disc 24 into contact with the rim 29 resulting in a reversal of the motion of the parts as contrasted with that previously described. Assuming the thread on the end of the work piece 65 to be a normal right hand thread, this forward motion of the work piece will cause the die 18 to become unthreaded from the piece 65. It now becomes a simple matter to rotate the clamp wheel 60 in an opposite direction, to remove the work piece 65 and to replace it with a fresh or untreated piece corresponding to the work piece 65.

It may thus be seen that I have disclosed a novel and useful threading and tapping machine which is readily adapted for treating a large number of pieces in quick succession and which after a simple series of setting operations produces a plurality of parts having uniformly worked characteristics with relatively low degree of tolerances in conformity between individual parts treated.

I wish it to be understood that I do not desire to be limited to the exact details of construction shown and described, for obvious modifications will occur to a person skilled in the art.

In the following claims, the expression threading tool is intended to refer to a tool capable of cutting or applying threads either to a male or female member so as to provide a threading or tapping operation respectively.

I claim:

1. A machine of the class described for threading a work piece comprising, a carriage, a head forming a part of said carriage and having a bore therein, a collet associated with said head and being seated in said bore, a wheel having a hub to operate said collet for adjusting said work piece in said collet, a screw cutting tool, reversible driving means for rotating said screw cutting tool in either direction, means to mount said carriage for movement toward and from the screw cutting tool, and adjustable stop means to limit the movement of the carriage toward the screw cutting tool.

2. A screw cutting machine comprising a driving shaft, a pair of driving members thereon, a rotating wheel for engagement with either of said drive members, said shaft being axially movable to permit driving engagement of either of said members with said wheel thereby to reverse the direction of rotation of said shaft, screw cutting means carried and driven by said shaft, a work piece holding collet having a work piece holding bore, means to contract the bore in said collet thereby to hold a work piece substantially in axial alignment with said screw cutting means, a stop member which may be pre-set to determine the depth of insertion of a series of given work pieces into said collet bore, means for supporting said adjustable collet and being axially slidable for causing engagement of a work piece with said screw cutting means and for causing selective engagement of said members with said wheel, and means to limit the degree of movement of said axially slidable supporting means to determine the extent of the screw cutting operation.

HANDEL ASHWORTH.